W. R. BROWN.
DRILLING MACHINE.
APPLICATION FILED APR. 1, 1919.

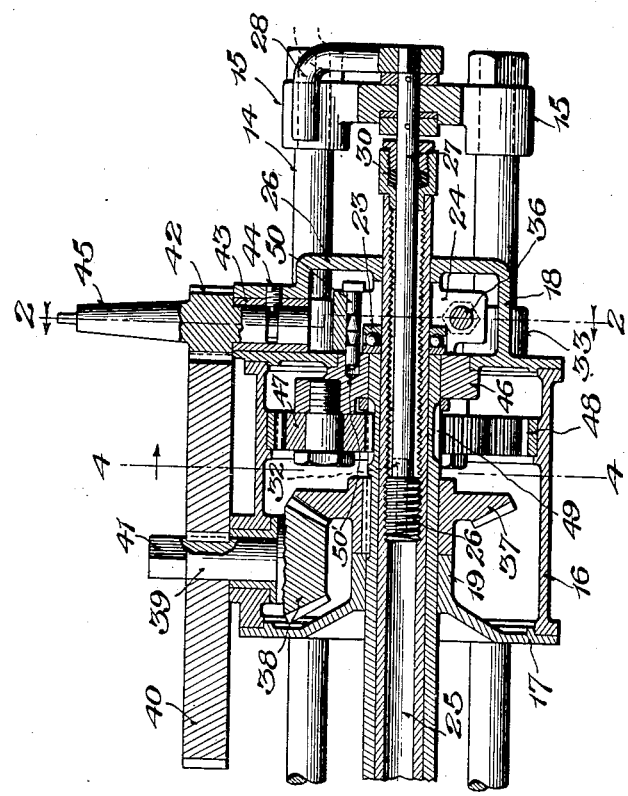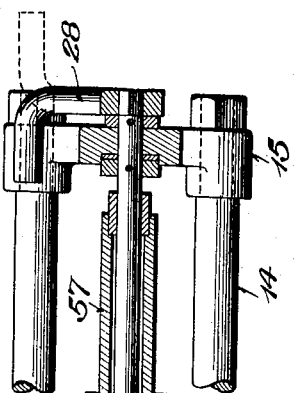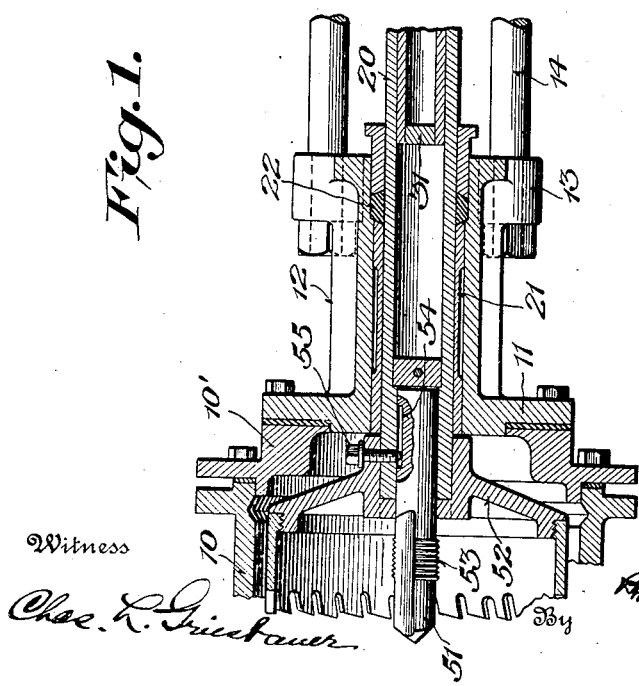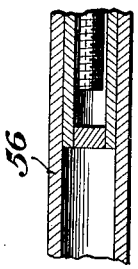

1,347,614.

Patented July 27, 1920.
3 SHEETS—SHEET 2.

Witness
Chas. L. Griesbauer

Inventor
William R. Brown
By Lugne. Coulinaux ＆ Co.
Attorney

W. R. BROWN.
DRILLING MACHINE.
APPLICATION FILED APR. 1, 1919.

1,347,614. Patented July 27, 1920.
3 SHEETS—SHEET 3.

Witness
Chas. L. Griesbauer

Inventor
William R. Brown
By Cuyer, Leichnaufer
Attorneys

UNITED STATES PATENT OFFICE.

WILLIAM R. BROWN, OF DECATUR, ILLINOIS, ASSIGNOR TO ADOLPH MUELLER, TRUSTEE, OF DECATUR, ILLINOIS.

DRILLING-MACHINE.

1,347,614.  Specification of Letters Patent.   Patented July 27, 1920.

Application filed April 1, 1919. Serial No. 286,762.

*To all whom it may concern:*

Be it known that I, WILLIAM R. BROWN, a citizen of the United States, residing at Decatur, in the county of Macon and State of Illinois, have invented new and useful Improvements in Drilling-Machines, of which the following is a specification.

This invention relates to machines for cutting branch openings in pipes, particularly water pipes and mains where it is desired to make branch connection while the main or other pipe is filled with water under pressure.

It will be shown and described in connection with water main or pipe, but it will be understood that it may be used in connection with any fluid conducting pipe or main.

It has for its object to improve the mechanism and appurtenances for driving, feeding and adjusting the cutting tools, provision being made for either automatic or hand feeding of the cutting tools, and such tools are so disposed with relation to each other and their associated parts that they will automatically adjust themselves to the needs of the work in order to prevent breakage or jamming of the parts.

Generally this class of apparatus, as now known, has a supporting frame which, as in the well known Mueller machine for making lateral or branch connections, is clamped in position on the valve sleeve or branch to give a water-tight connection within which cutting tools may work. Such tools comprise ordinarily a center drill for tapping through the pipe, which center drill is surrounded by a shell cutter designed to cut an opening in the main of the proper dimension for the branch fitting which is to be secured to such main. Suitable drive and feed mechanisms are provided for rotating and feeding, as the cutting progresses, both the drill and the shell cutter.

In the present development the same general arrangement of supporting frame and associated parts is found, my improvements in the driving, feeding and adjusting features being imposed thereon.

In order that the invention may be clear to those skilled in the art, I have shown in the accompanying drawings one embodiment thereof, although it will be understood that the disclosure is merely illustrative and in no sense restrictive of the invention, as it may be varied, so far as mechanical makeup is concerned, without departing from my invention.

In the drawings:

Figure 1 is a longitudinal section of a drill or tapping machine made in accordance with my invention, portions of the apparatus being in elevation.

Fig. 6 is a fragmentary view of the feed rod and shaft showing a modified construction.

Figure 2:
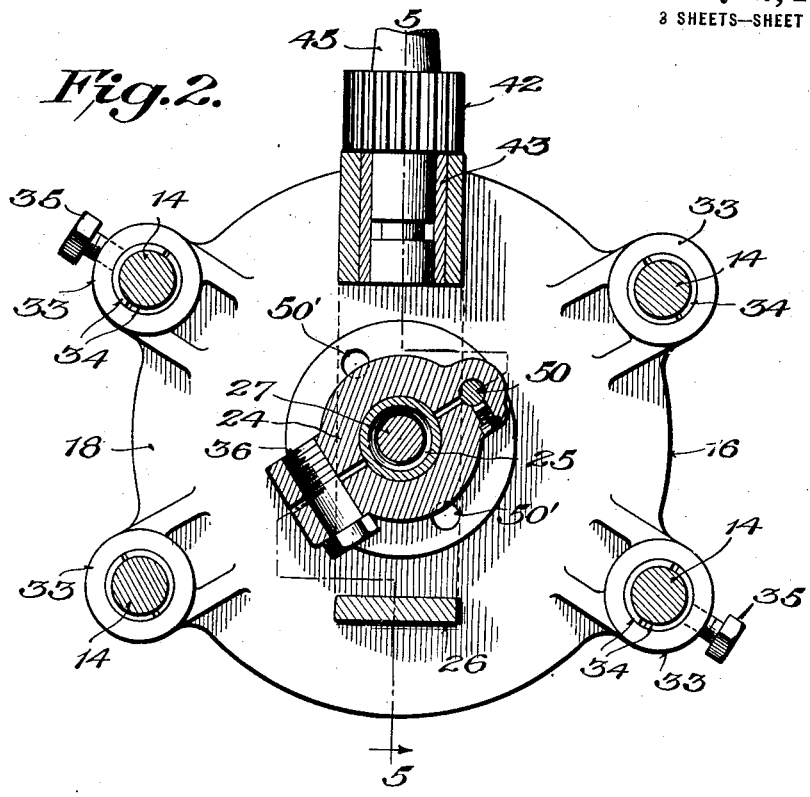
Fig. 2 is a transverse sectional view substantially on the line 2, 2, of Fig. 1 looking in the direction of the arrows.

Referring to the drawings by numbers, like numbers indicating like parts in the several views, 10 denotes a portion of the sleeve of the valve fitting, which fitting is secured to the main to be tapped in any usual manner well known to those skilled in the art, one method being by use of the adapter 10′, it being customary to furnish such adapters in various sizes to take care of the different sizes of valves to be installed. To this sleeve is secured, in any suitable manner, as by bolts and any suitable packing to form a fluid tight joint, the flange 11 of the supporting head 12 of the cutting machine. Said head 12 has a central bore and is provided at its other end with cross arms 13 which take side rods or carrier bars 14, four of which are shown in the present example. At their outer ends the said carrier bars or side rods are connected by a cross head 15, the cross heads 13 and 15 being securely bolted together by the side rods 14 to form a rigid carrier frame for the cutting parts, their driving and feeding mechanisms and the inclosing casing or housing for these parts.

Mounted upon the side rods 14 is a casing 16 formed, as shown in the present instance, cylindrical in cross section, although it may be of any desired design. Said casing is provided with heads 17 and 18, the head 17 having an inwardly projecting sleeve 19 forming a bearing for the main shaft of the apparatus, while the head 18 serves as a bearing for the feeding and driving elements, presently to be described.

The main shaft 20 traverses the frame 12 centrally, its cutter carrying end being mounted in a suitable bearing 21 in such head, a stuffing box 22 being provided to make a water tight bearing so as to prevent water under pressure, when the apparatus is in place, from working back from the main about the shaft. The other end of the shaft 20 is mounted in the bearing 19, heretofore referred to on the head 17, the extreme end of the shaft 20 bearing against a thrust collar 23 which engages a collar or clamp 24.

The said clamp 24 is held to a feed shaft 25 which telescopes in the hollow main cutter driving shaft 20 by means of a screw 36 or other suitable means, so that the same may be loosened and the cutter and feed shafts and the gear casing, with all their associated parts, may be moved bodily toward and from the work. A bearing for the feed shaft 25 is provided by the strut 26 on the head 18 of the inclosing casing. With this construction it will be obvious that when the clamp 24 is loosened an independent sliding movement of the cutter shaft, the casing, and its contained parts may be made relative to the feed shaft and the frame so that when the machine is brought to the work and mounted on the branch or valve fitting for the tapping operation the cutting tool and its operating parts may be thrust forward and quickly adjusted by sliding the parts in the manner stated, so as to bring the tool into cutting contact with the main. Thereupon the clamp 24 will be set up so as to lock the parts in proper position for the cutting operation and the feeding forward as the cutting proceeds, as will now be described.

The main cutter shaft and its tools are fed by a screw or rod 27, mounted in a fixed bearing to prevent longitudinal movement and permit rotation in the head 15, (see Figs. 1 and 5) the outer end of the rod 27 having a removable crank handle or equivalent device 28 which may be turned either to the full line position shown or the position indicated in dotted lines. The end of the feed rod 27 is threaded at 29 and engages the threaded bore of the feed shaft 25, the rod passing through a stuffing nut 30 in the end of the feed rod 25. This nut 30 is driven into the end of the hollow feed rod 25 and held by friction, so that should the feed rod 27 be fed back too far in the hollow feed shaft 25 the threaded portion 29 would force the stuffing nut out of frictional engagement with the feed shaft 25 and no injury to the threaded surfaces could occur. The lower end of the feed shaft 25 has a plug 31 so that the feed shaft 25 is closed at both ends, and when the machine is assembled, and thereafter whenever necessary, it may be supplied with oil to lubricate the threaded feed shaft and feed rod. In order that there may be no trapping of oil at either end of the hollow feed shaft 25, I preferably form a by-pass 32, shown in dotted lines in Fig. 1, for the threaded portion 29 of the feed rod 27, which permits oil trapped on either side of this threaded portion to flow readily to the opposite side and no resistance is offered to the travel of the parts.

With this arrangement it will be seen that rotation of the feed rod 27 in one direction or the other will cause a corresponding traverse of the feed shaft 25, and as the casing 16 with its contained parts are clamped to the feed shaft 25, by the clamp 24, such casing will move with the shaft 25, said casing being supported on the side rods 14 by lugs 33 which are preferably provided with the split bushings 34, and one or more of which lugs is provided with locking screws 35 by which the casing and its associated parts may be locked in position, as, for example, when setting the feed screw 29 relative to the feed shaft 25 to adapt the apparatus to the particular work in hand. The clamp 24, which is adjustably mounted by means of the tightening screw 36 on the hollow feed shaft 25, bears, as has been stated, against the thrust collar 23 which abuts the end of the main cutter bearing shaft 20, said thrust collar 23 being of the ball-bearing type preferably to reduce friction, so that as the feed shaft 25 is fed in one direction or the other by the feed rod 27 the thrust of the feed shaft will be transmitted to other traversing parts through the clamp 24.

Figure 5:
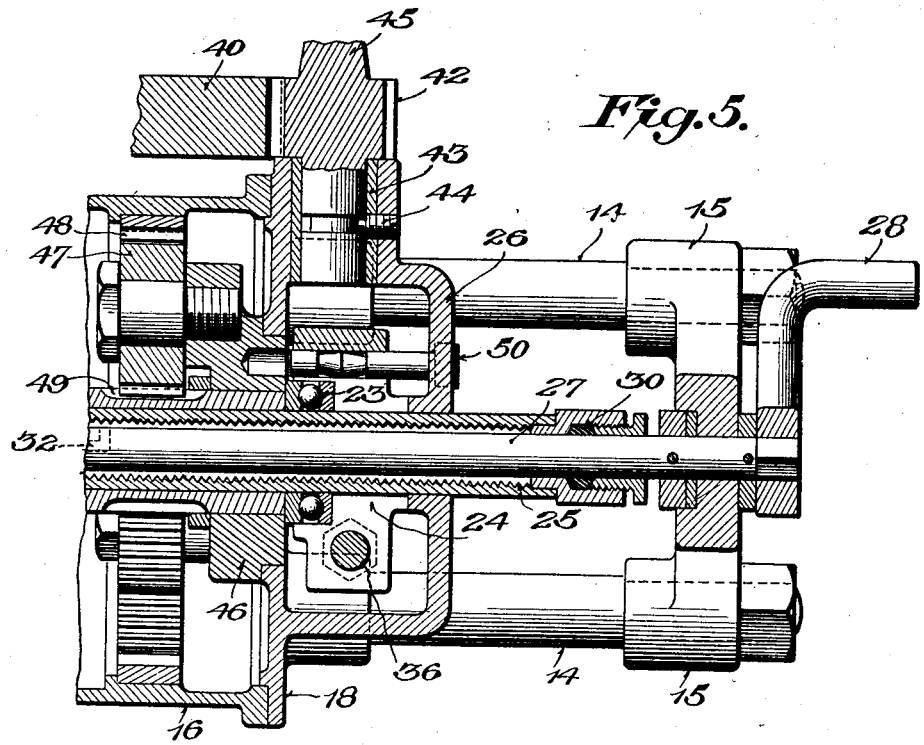
Fig. 5 is a sectional view, somewhat enlarged, of the feed mechanism shown in Fig. 1, on line 5—5, Fig. 2.
Figure 4:
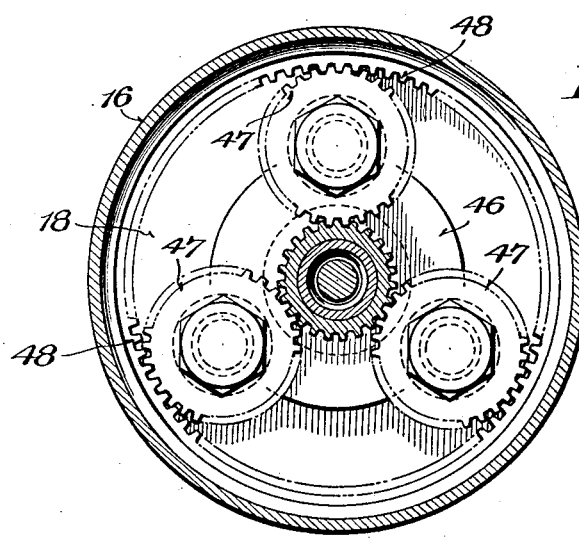
Fig. 4 is a view substantially on the line 4, 4, of Fig. 1 looking in the direction of the arrows.

In order to drive the shaft 20, I preferably key thereto within the casing 16 a gear 37, adjacent the stub shaft 39 mounted in a bearing in the side of the casing 16, shaft 39 having thereon a pinion 38 and preferably a projecting outer end 41 which is square or otherwise formed for the reception of a hand operated device, as, for example, a hand ratchet handle (not shown) and by which the cutter shaft through the gears described may, if desired, be manually driven. The shaft 20 may, if desired, be power driven by means of a driving pinion 42 mounted in the bearing 43 on the head 18 of the casing and meshing with a gear 40 keyed to shaft 39, as shown in Figs. 1 and 5, a locking screw 44 being provided to engage a groove on the pinion shaft and hold it in position.

Outwardly of the pinion 42 projects a gudgeon 45 to which may be secured or coupled in any suitable manner a motor, preferably of the electric type, (not shown) so that upon application of the power the cutter shaft 20 will be driven through the gearing just described.

It will be understood that the hand feeding through the feed shaft and feed rod described may be practised with either manually driven or power driven cutter shaft, and there are at times advantages in a hand feed as it enables the operator by the "feel" of the cutting instrumentalities, to determine and gage the feed of the cutters to the work being done and eliminates danger of over-feeding and perhaps injury of the cutters if, in the metal being worked upon, uneven density occurs in the path of the cutting tools.

Figure 3:
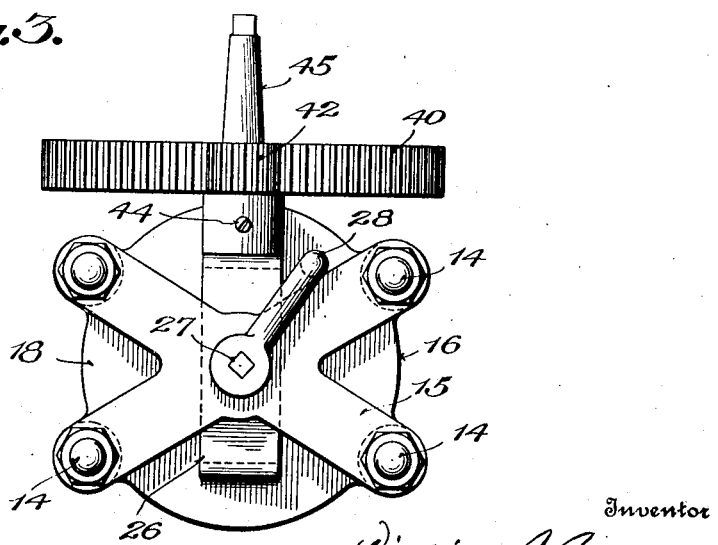
Fig. 3 is an end view of the apparatus shown in Fig. 1 looking from the right in said figure.

It is not uncommonly the case, however, that the feed may be automatically performed without danger, and to accomplish this automatic feed I have provided mechanism for reversing the drive of the feed shaft 25 and the feed rod 27 so that, as distinguished from hand feeding, the rod 27 remains stationary and the shaft 25 is rotated. The mechanism for bringing this about is all compactly arranged and housed within the casing 16 with the driving and feed mechanisms heretofore described. Rotatively mounted on the end of the main cutter shaft 20 with its end projecting through an opening in the casing head 18, is a pinion carrier 46, comprising a shaft with preferably three arms projecting therefrom, to each of which arms is secured a pinion 47. The pinions mesh with an internal gear or rack 48 on the inside of the casing 16, and they mesh also with a gear 49 formed on the exterior of the main cutter shaft 20, so that as the carrier revolves there will be imparted to the shaft 46 a rotary motion, which will be transmitted to the clamping collar 24 and the feed shaft 25 by means of a locking latch 50 mounted in the collar 24 and movable from the position shown in Fig. 1, in which it engages a socket 50', two of which are shown in the carrier 46 so as to lock the clamp 24 and the carrier together for automatic feeding to the position shown in Fig. 5, in which the latch 50 is withdrawn so that its outer end abuts the stationary strut 26 on the casing and in which position it locks the clamp and the feed shaft 25 against rotation but permits longitudinal movement of the feed shaft 25 under the action of the hand operated feed rod 27. In this position of the parts for automatic feeding the handle 28 on the feed rod 27 will be turned to the position shown in full lines in Figs. 1, 3, and 6, with the handle portion locked against one of the bars of the cross head 15. This will result in holding the threaded rod 27 fixed and the feed shaft 25, through the planetary gearing and couplings just described, will be rotated and it, together with its attached parts, fed in one direction or the other along the fixed screw threaded end 29 of the rod 27.

When desired, the automatic feed and the manual feed may be used simultaneously to increase the advance of the cutter shaft. This will be accomplished by throwing in the automatic feed, heretofore referred to and which drives the feed shaft 25 relative to the threaded portion 29 of the feed rod 27 and simultaneously with such automatic driving of the feed shaft reversing the crank or manual handle 28 and turning it by hand in a direction opposite to the direction of rotation of the feed shaft 25, so as to add to the normal automatic advance of the cutter shaft by imposing on the feed shaft the thrust of the counter driven feed rod.

As is usual in machines of this type, the main driving shaft 20 has at its lower end the pilot drill 51 and the shell cutter 52, it being understood that these tools may be of different types and designs. The pilot drill operates in advance of the shell cutter and pierces the main first, after which the shell cutter 52 begins to act and makes the circular kerf in the wall in order to cut out the proper section for the branch opening. The pilot is ordinarily provided with the thread cutter 53 so that when the circular piece is completely cut by the shell cutter it will have been engaged by the threads 53, so that it can be held to the tool and removed. Heretofore it has been customary to fix the pilot relative to the shell cutter and it has sometimes occurred that after the threads 53 had engaged the metal, the rate of feed of the shell cutter and pilot drill would be different from the normal pitch speed of the threads, which would result in stripping the threads on the pilot drill. To overcome this difficulty, I have provided for a give and take of the pilot drill relative to the other parts, sufficient to take care of any variations in drill speed and pitch speed of the threads which may occur, and this result is accomplished by providing the pilot drill at its shank end with a key-way 54 which is engaged by a screw 55 tapped through the shank of the shell cutter and the main shaft 20, so that the pilot drill 51 has an independent longitudinal movement relative to the other parts and may move at a higher or less rate of speed in order to protect its threads if the cutting speed and the pitch speed vary. The screw 55, as is herein shown, is the locking screw for holding the shell cutter to the shaft, and I have given it the added function of providing for pilot drill play and it serves, of course, to drive the pilot drill while permitting its free longitudinal movement.

In Fig. 6 I have shown a slightly modified form of feed shaft and screw, and in said figure 56 indictes the main cutter shaft, 57 the feed shaft, and 58 the feed rod, the other parts shown being as in the form of the apparatus shown in the other views. In this form the long interior thread in the feed shaft 57 is dispensed with, a short section 59 of the shaft being circumferentially upset to form an inward bulge which is threaded, this method of forming the inwardly projecting bulge being a convenient one, although it should be understood that it may be variously made. The feed rod 58 engages this threaded projection interiorly of the shaft 57, the rod 58 being threaded throughout a sufficient length to give the maximum feed movements necessary. This construction has some practical value for the reason that it does away with the necessity of the long interior thread, shown in the other view, inside of the feed shaft, that long thread in the form shown in Fig. 6 being transferred to the feed rod, with the short threaded portion interiorly of the feed shaft.

The structure illustrated in the drawings, and described in the foregoing specification possesses a number of advantageous features not found in other machines of this class now on the market, and in order to direct attention to the objects of my improvement I will herein enumerate some of the principal features referred to.

First, I provide for thorough lubrication of the feed-screw threads.

Second, positive protection of the feed-screw threads against destructive action of sand and other foreign matter is secured by complete inclosure of feed-screw and internal threads of feed-shaft.

Third, positive protection against breakage of the feed mechanism is accomplished by my particular arrangement of working parts. Locking feed-screw handle and feed-screw latch at the same time will not block the mechanism, nor can mechanism be blocked against free rotation by putting the hand and automatic feed devices in any of the several combinations of positions that are possible.

Fourth, the use of the split collar or clamp 24 permits shifting of cutter, cutter-shaft and gear case by hand pressure instead of the much slower method of rotating the feed-screw.

Fifth, compensation is provided for by my method of holding pilot drill, which insures against stripping of the screw-threads on this drill.

Sixth, I have provided for a simple and positive means whereby the cutter may be fed by hand or automatically.

The important objects mentioned above are accomplished by the particular structure of my mechanism, and would not otherwise be possible. I have so arranged the parts that the usual key-way or long groove has been eliminated from the shank of the feed-screw. This has made it possible to use an ordinary packing gland on the outer end of this screw for the purpose of closing one end of the hollow feed-shaft. The advantages embodied in the feeding mechanism are made possible by the separate feed-shaft rotatively mounted within the main cutter shaft.

The features mentioned are of the greatest importance in a machine of this class due to the fact that such machines are usually operated by persons of very inferior mechanical ability, and the fact that such machines are necessarily used in trenches and similar places where they are frequently buried under earth or mud. My improvements have for their objects the provision of a drilling machine which will operate successfully under all practical conditions.

Such changes in construction and disposition of parts as are within the range of mechanical skill may, of course, be made without departing from the spirit of my invention.

I claim:

1. In a machine of the class described, the combination of a supporting frame, a cutter shaft rotatably mounted in said frame, gear mechanism for rotating said shaft, a manually operable shaft for actuating said gear mechanism, a power shaft removably mounted on said frame, and a disconnectible connection between said manually operable shaft and said removably mounted power shaft.

2. In a machine of the class described, the combination of a supporting frame, a cutter shaft rotatably and longitudinally movable in said frame, means for moving said shaft longitudinally, gear mechanism for rotating said shaft, a manually operable shaft for actuating said gear mechanism mounted on said frame, a power shaft removably mounted on said frame, and a disconnectible driving connection between said power shaft and said manually operable shaft.

3. In a machine of the class described, the combination of a supporting frame, a cutter shaft rotatably mounted in said frame, gears for rotating said shaft, a gear-housing, a manually-operable shaft for actuating said gears projecting through said housing, a power shaft removably mounted in a bearing in said housing, a motor-receiving gudgeon on said power shaft, and a gear train connecting said power shaft and said manually-operable shaft.

4. In a machine of the class described, the combination of a supporting frame, a cutter shaft rotatably and longitudinally movable in said frame, means for rotating said shaft, means for feeding said shaft longitudinally, manual means for actuating said feeding mechanism, power-driven means independent of said manual means for feeding said shaft automatically, and means for intermitting the action of said power-driven feeding means.

5. In a machine of the class described, the combination of a supporting frame, a cutter shaft rotatably and longitudinally movable in said frame, means for rotating said shaft, means for feeding said shaft manually, means for intermitting said manual feed, means independent of said manual feeding means for feeding said shaft automatically, driving connections between said shaft-rotating means and said automatic feed mechanism, and means for intermitting the action of said automatic feed mechanism.

6. In a machine of the class described, the combination of a frame, a cutter shaft rotatably and longitudinally movable in said frame, means for rotating said cutter shaft, a feed shaft telescoping said cutter shaft, a feed-rod telescoping said feed shaft, means for manually operating said feed-rod, and a connection between said feed-shaft and the driving means for said cutter shaft to actuate said feed shaft.

7. In a machine of the class described, the combination of a frame, a cutter shaft rotatably and longitudinally movable in said frame, means for rotating said cutter shaft, a feed shaft telescoping said cutter shaft, a feed-rod telescoping said feed shaft, means for manually operating said feed-rod, means for locking said feed rod, and a disconnectible connection between said feed-shaft and the driving means for said cutter shaft to actuate said feed shaft.

8. In a machine of the class described, the combination of a frame, a cutter shaft rotatably and longitudinally movable in said frame, means for rotating said cutter shaft, a feed shaft telescoping said cutter shaft, a gear train connecting said cutter shaft with said feed shaft to effect longitudinal movement of the cutter shaft, and a feed-rod telescoping said feed shaft and along which feed rod said feed shaft travels.

9. In a machine of the class described, the combination of a frame, a cutter shaft rotatably and longitudinally movable in said frame, means for rotating said cutter shaft, a feed-shaft telescoping said cutter-shaft, a gear train connecting said cutter shaft with said feed-shaft, a feed-rod telescoping said feed-shaft, and manual means for actuating said feed-rod.

10. In a machine of the class described, the combination of a frame, a cutter shaft rotatably and longitudinally movable in said frame, means for rotating said cutter shaft, a feed-shaft telescoping said cutter shaft, a gear train driven by said rotating cutter shaft, a releasable coupling between said gear train and said feed-shaft, and a feed rod telescoping said feed-shaft.

11. In a machine of the class described, the combination of a frame, a hollow cutter shaft rotatably and longitudinally movable in said frame, means for rotating said cutter shaft, a feed shaft telescoping said hollow cutter shaft, a gear on said cutter shaft, a gear train meshing with said cutter shaft gear, a second shaft driven by said gear-train, a longitudinally-adjustable arm on said feed shaft, and a detachable coupling between said arm and second shaft.

12. In a machine of the class described, the combination of a frame, a cutter shaft rotatably and longitudinally movable in said frame, driving gears for said cutter shaft, a gear on said cutter shaft, a ring gear encircling said shaft, a gear train meshing with said shaft and ring gears, a second shaft on which gear train is mounted, a feed shaft to move said cutter shaft longitudinally, a radially disposed longitudinally adjustable arm on said feed shaft, and a latch to couple said arm and second shaft.

13. In a machine of the class described, the combination of a hollow cutter shaft, a hollow feed shaft telescoping said cutter shaft and having one end closed, a feed rod telescoping said feed shaft, and a feed rod support frictionally held in the other end of said feed shaft.

14. In a machine of the class described, the combination of a hollow cutter shaft, a hollow feed shaft telescoping said cutter shaft and having one end closed, a feed rod telescoping said feed shaft, and a stuffing nut for said feed rod frictionally held in the other end of said feed shaft.

15. In a machine of the class described, the combination of a hollow cutter shaft, a hollow feed shaft telescoping said cutter shaft and having fluid-tight closures at its ends, a feed rod telescoping said feed shaft and having an interior threaded connection therewith, and a by-pass for fluid flow around said threaded connection.

16. In a machine of the class described, the combination of a hollow cutter shaft, a hollow feed shaft telescoping said cutter shaft and having fluid-tight closures at its ends, a feed rod telescoping said feed shaft and having an interior threaded connection therewith, and a by-pass through said feed rod for fluid flow around said threaded connection.

17. In a machine of the class described, the combination of a hollow feed shaft having a portion of its wall inset to form an inwardly projecting threaded nut, and a feed rod telescoping said feed shaft and in threaded engagement with said nut.

18. In a machine of the class described, the combination of a frame, a cutter shaft, means for rotating said shaft, means for feeding said shaft longitudinally, and a releasable coupling between said shaft and feeding means to permit independent longitudinal movement of said elements relative to each other.

19. In a machine of the class described, the combination of a frame, a cutter shaft, means for rotating said shaft, means for feeding said shaft longitudinally, automatic means for effecting shaft feed, a releasable coupling between said shaft and feeding means to permit independent longitudinal movement of said elements relative to each other, and means for locking said coupling to said automatic feeding means.

20. In a machine of the class described, the combination of a frame, a cutter shaft, means for rotating said shaft, means for feeding said shaft longitudinally, automatic means for effecting shaft feed, manual means for feeding said shaft longitudinally of said frame, a releasable coupling between said shaft and feeding means, and means for locking said coupling to said automatic feeding means.

21. In a machine of the class described, the combination of a frame, a cutter shaft, means for rotating said shaft, a feed shaft, a releasable coupling between said shafts, a gear train for feeding said cutter shaft automatically through said coupling relative to said feed shaft, and means for locking said coupling to said gear train.

22. In a machine of the class described, the combination of a frame, a cutter shaft, means for rotating said shaft, a feed shaft, a clamp releasably mounted on said feed shaft, a gear train for feeding said cutter shaft automatically through said coupling, and a latch connecting said clamp to said gear train.

23. In a machine of the class described, the combination of a frame, a cutter shaft, means for rotating said shaft, a rotatable feed shaft, means for locking said feed shaft against rotation, a clamp releasably mounted on said feed shaft, automatic feeding means for said cutter shaft, and a releasable connection between said automatic feeding means and said clamp.

24. In a machine of the class described, the combination of a frame, a cutter shaft, means for rotating said shaft, a rotatable feed shaft telescoping said cutter shaft, means for locking said feed shaft against rotation, a clamp releasably mounted on said feed shaft, automatic feeding means for said cutter shaft, and a latch on said clamp to engage said automatic feeding means.

25. In a machine of the class described, the combination of a frame, a cutter shaft, means for rotating said cutter shaft, means for automatically feeding said cutter shaft longitudinally, a clamp member movable with said cutter shaft, means for detachably connecting said clamping member to said automatic feed means, and a feed shaft releasably engaged by said clamping member.

26. In a machine of the class described, the combination of a frame, a cutter shaft, means for rotating said shaft, a gear train for feeding said shaft, a clamping member movable with said shaft, a latch coupling said clamping member with said gear train, said latch being movable to a position to lock said clamp against rotation, and a feed shaft to which said clamp is releasably connected.

27. In a machine of the class described, the combination of a frame, a cutter shaft, means for rotating said cutter shaft, a feed shaft engaging said cutter shaft, a releasable clamp on said feed shaft, means for feeding said cutter shaft longitudinally relative to said feed shaft, and a latch connecting said clamp and said feeding means, said latch being movable to a position to lock said clamp and feed shaft against rotation.

28. In a machine of the class described, the combination of a frame, a cutter shaft, means for rotating said shaft, a feed shaft, means driven by said rotating cutter shaft to effect longitudinal movement of said cutter and feed shafts, a clamp releasably mounted on said feed shaft, and a latch coupling said clamp and driven means, said latch being movable to disengage clamp and driven means and lock said clamp and feed shaft against rotation.

In testimony whereof of have hereunto set my hand.

WILLIAM R. BROWN.